US008644176B1

(12) United States Patent
Shah et al.

(10) Patent No.: US 8,644,176 B1
(45) Date of Patent: Feb. 4, 2014

(54) METHODS AND SYSTEMS FOR SUPPORTING ENHANCED NON-REAL-TIME SERVICES FOR REAL-TIME APPLICATIONS

(75) Inventors: Maulik K. Shah, Overland Park, KS (US); Jasinder P. Singh, Olathe, KS (US); Anthony K. Leung, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 491 days.

(21) Appl. No.: 12/721,822

(22) Filed: Mar. 11, 2010

(51) Int. Cl.
H04L 12/26 (2006.01)

(52) U.S. Cl.
USPC .......................................... 370/252; 370/352

(58) Field of Classification Search
None
See application file for complete search history.

(56) References Cited

U.S. PATENT DOCUMENTS

| 6,021,328 | A | 2/2000 | Curtis et al. |
|---|---|---|---|
| 6,480,541 | B1 | 11/2002 | Girod et al. |
| 6,591,110 | B1 | 7/2003 | Kim et al. |
| 6,606,496 | B1 | 8/2003 | Salvarani et al. |
| 6,625,119 | B1 | 9/2003 | Schuster et al. |
| 6,839,356 | B2 | 1/2005 | Barany et al. |
| 6,980,523 | B1 | 12/2005 | Lipford et al. |
| 7,058,124 | B2 | 6/2006 | Koo |
| 7,099,283 | B2 | 8/2006 | Matta et al. |
| 7,130,311 | B2 | 10/2006 | Yavuz et al. |
| 7,142,562 | B2 | 11/2006 | Yavuz et al. |
| 7,245,915 | B2 | 7/2007 | Matta et al. |
| 7,328,027 | B1 | 2/2008 | Mangal |
| 7,411,923 | B2 | 8/2008 | Attar et al. |
| 7,411,974 | B2 | 8/2008 | Attar et al. |
| 7,426,395 | B2 | 9/2008 | Stephens |
| 7,440,431 | B2 | 10/2008 | Sindhushayana et al. |
| 7,486,645 | B2 | 2/2009 | Li et al. |
| 2003/0064741 | A1 | 4/2003 | Silva et al. |
| 2003/0117956 | A1 | 6/2003 | Lee |
| 2004/0017860 | A1 | 1/2004 | Liu |
| 2004/0057420 | A1 | 3/2004 | Curcio et al. |
| 2004/0196852 | A1 | 10/2004 | Aksu et al. |
| 2004/0259532 | A1* | 12/2004 | Isomaki et al. ............ 455/412.1 |
| 2005/0032522 | A1 | 2/2005 | Soong et al. |
| 2005/0286440 | A1 | 12/2005 | Strutt et al. |
| 2006/0077994 | A1 | 4/2006 | Spindola et al. |
| 2006/0233101 | A1 | 10/2006 | Luft et al. |
| 2006/0252429 | A1 | 11/2006 | Chen et al. |
| 2007/0060165 | A1 | 3/2007 | Black et al. |
| 2007/0109967 | A1 | 5/2007 | Ha |

(Continued)

FOREIGN PATENT DOCUMENTS

| WO | WO 2004/004249 A1 | 1/2004 |
|---|---|---|
| WO | WO 2004/028095 | 4/2004 |

OTHER PUBLICATIONS

U.S. Appl. No. 12/141,569, filed Jun. 18, 2008.
U.S. Appl. No. 12/432,736, filed Apr. 29, 2009.

(Continued)

*Primary Examiner* — David Oveissi

(57) ABSTRACT

Methods and systems for providing an enhanced best-effort quality of service (QOS) are provided. As third-party real-time applications may be unable to explicitly signal QOS requests in some environments, this enhanced best-effort QOS may be applied to real-time flows associated with third-party applications. For instance, devices in an access network may determine that a packet is part of a real-time flow of packets, and is associated with a third-party application. In response to this determination, these devices may forward the packet according to the enhanced real-time QOS.

18 Claims, 5 Drawing Sheets

(56) References Cited

U.S. PATENT DOCUMENTS

| | | |
|---|---|---|
| 2007/0195788 A1 | 8/2007 | Vasamsetti et al. |
| 2008/0049706 A1 | 2/2008 | Khandekar et al. |
| 2009/0010156 A1* | 1/2009 | Song et al. .................. 370/230 |
| 2009/0225655 A1 | 9/2009 | Ray et al. |

OTHER PUBLICATIONS

U.S. Appl. No. 12/350,694, filed Jan. 8, 2009.
U.S. Appl. No. 12/397,855, filed Mar. 4, 2009.
U.S. Appl. No. 12/494,999, filed Jun. 30, 2009.
U.S. Appl. No. 12/507,913, filed Jul. 23, 2009.
U.S. Appl. No. 11/746,229, filed May 29, 2007.
R. Ferrus et al., "Evaluation of a Cell Selection Framework for Radio Access Networks considering Backhaul Resource Limitations," The 18th Annual IEEE International Symposium on Personal, Indoor and Mobile Radio Communications (PIMRC'07).
Emilio Mino et al., "IST-4-027756 WINNER II, D4.8.3, Integration of Cooperation on WINNER II System Concept," Information Society Technologies, Nov. 29, 2007.
Gregory Conklin et al., "Video Coding for Streaming Media Delivery on the Internet", IEEE Transactions on Circuits and Systems for Video Technology, vol. 11, No. 3, Mar. 2001.
International Search Report and Written Opinion from International Application No. PCT/US2007/009296, dated Oct. 17, 2007.
Xin Liu et al., "Experiences in a 3G Network: Interplay between the Wireless Channel and Applications," MobiCom '08, Sep. 14-19, 2008.
Woon-Young Yeo et al., "Traffic Management of High-Speed CDMA Systems Base on Loan Prediction," IEICE Electronics Express, vol. 6, No. 7, pp. 389-394, published Apr. 10, 2009.
3rd Generation Partnership Project 2, "cdma2000 High Rate Packet Data Air Interface Specification," 3GPP2 C.S0024, v. 4.0 (Oct. 2002).
3rd Generation Partnership Project 2, "cdma2000 High Rate Packet Data Air Interface Specification," 3GPP2 C. S0024-0, v. 3.0 (Sep. 2006)

* cited by examiner

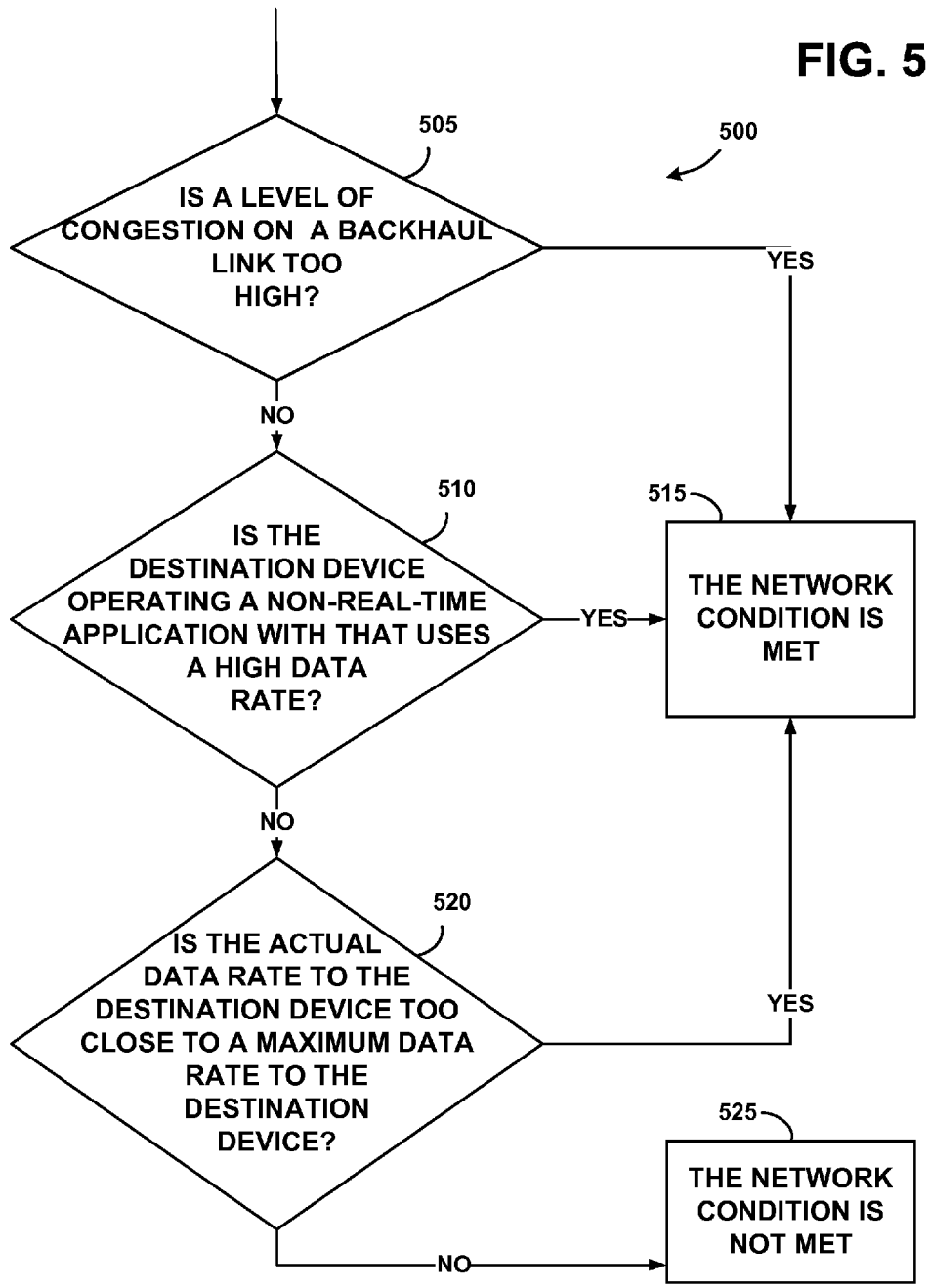

METHODS AND SYSTEMS FOR SUPPORTING ENHANCED NON-REAL-TIME SERVICES FOR REAL-TIME APPLICATIONS

BACKGROUND

Real-time packet-switched services, such as voice over Internet Protocol (VoIP), push-to-talk (PTT), and video on demand (VOD), have been widely deployed. Typically, these real-time services perform best when used in a low-latency, low jitter network environment. Accordingly, cellular telephones, personal digital assistants, personal computers, and other types of endpoints may request a particular desired quality of service (QOS) from other network devices in the path of the real-time service. These other network devices, such as switches, routers, firewalls, and access gateways, may then determine whether to honor such a request.

However, new types of real-time applications are emerging that typically do not explicitly request or signal their QOS requirements to other network devices. Instead, these applications, which may be referred to as "third-party" real-time applications, normally rely on network paths between endpoints to have sufficient capacity to provide a reasonable level of QOS. Thus, these applications may rely upon a best-effort level of QOS to provide adequately low latency and jitter.

OVERVIEW

In order to improve the performance of third-party real-time applications, as well as the real-time services offered by these applications, methods and systems for supporting enhanced non-real-time services for real-time applications are described herein. In particular, these methods and systems allow devices in the path of a third-party real-time service to determine that a given packet is from such a service, and then to mark the given packet with either an enhanced best-effort QOS or a best-effort QOS. Preferably, the device gives packets marked with the enhanced best-effort QOS a higher priority than packets marked with the best-effort QOS. The devices may also forward the given packet to its destination according to the enhanced best-effort QOS, thus providing third-party real-time services with potentially less latency and jitter than best-effort services.

Accordingly, in a first embodiment, an access device that supports a non-real-time best-effort QOS and a non-real-time enhanced best-effort QOS, may receive a packet. Preferably, the packet is marked to indicate that it is part of a real-time flow of packets. The real-time flow may generated by a VoIP application, PTT application, VOD application, or another type of real-time application. Based on whether one or more network conditions are met, the access device may determine whether to apply the enhanced best-effort QOS or the best-effort QOS to the packet when forwarding the packet to a destination device. These network conditions may include congestion on a backhaul link that the access device uses to communicate to the destination device, the data rate of one or more non-real-time applications operating at the destination device, or may be based on the difference between a maximum data rate between the access device and the destination and an actual data rate between the access device and the destination.

The embodiments herein may be particularly applicable to wireless access networks. Generally speaking, wireless network links exhibit less capacity than most wireline network links. Also, wireless capacity may fluctuate as a wireless network experiences interference, and/or attenuation. Thus, it may be relatively difficult to provide a consistent level of QOS on wireless network links. Therefore, granting third-party real-time services an enhanced best-effort QOS over wireless network links may be an effective way of enabling these services to have sufficient capacity and to provide a reasonable level of QOS.

Accordingly, in a second embodiment, a radio access network (RAN) radiates to define a wireless coverage area that provides service to wireless communication devices (WCDs). A radio network controller (RNC) in the RAN supports a first non-real-time QOS and a second non-real-time QOS. The RNC may receive a packet that specifies a given WCD as a destination, and that is marked as being part of a real-time flow of packets. In response to receiving the packet, the RNC may determine whether one or more network conditions are met. Based on the outcome of this determination, the RNC may apply the first non-real-time QOS or the second non-real-time QOS to the packet when forwarding the packet to the given WCD. Like in the first embodiment, these network conditions may include congestion on a backhaul link that the access device uses to communicate to the given WCD, the data rate of one or more non-real-time applications operating at the given WCD, or may be based on the difference between a maximum data rate between the access device and the given WCD and an actual data rate between the access device and the given WCD.

These and other aspects and advantages will become apparent to those of ordinary skill in the art by reading the following detailed description, with reference where appropriate to the accompanying drawings. Further, it should be understood that the foregoing overview is merely exemplary and is not intended to limit the scope of the invention as claimed.

BRIEF DESCRIPTION OF THE DRAWINGS

FIG. 5 is another flow chart in accordance with a preferred embodiment.

DESCRIPTION

Disclosed herein are methods and systems for supporting enhanced non-real-time services for real-time packet flows. In one example embodiment, a WCD may engage in communication using a third-party real-time application. Normally, a RAN serving the WCD would grant real-time packet flows generated by this third-party application only best-effort service. As a result, the QOS requirements of the third-party application might not be met. However, in this example embodiment, the RAN grants the real-time packet flows an enhanced best-effort service, if certain one or more network conditions are met. For instance, if the RAN or other network components are or have been experiencing congestion, the RAN may choose grant the WCD's real-time packet flows the enhanced best-effort service. In this way, the packets from these flows are less likely to be delayed or dropped than packets from best-effort flows.

I. Network Architecture

Figure 1:
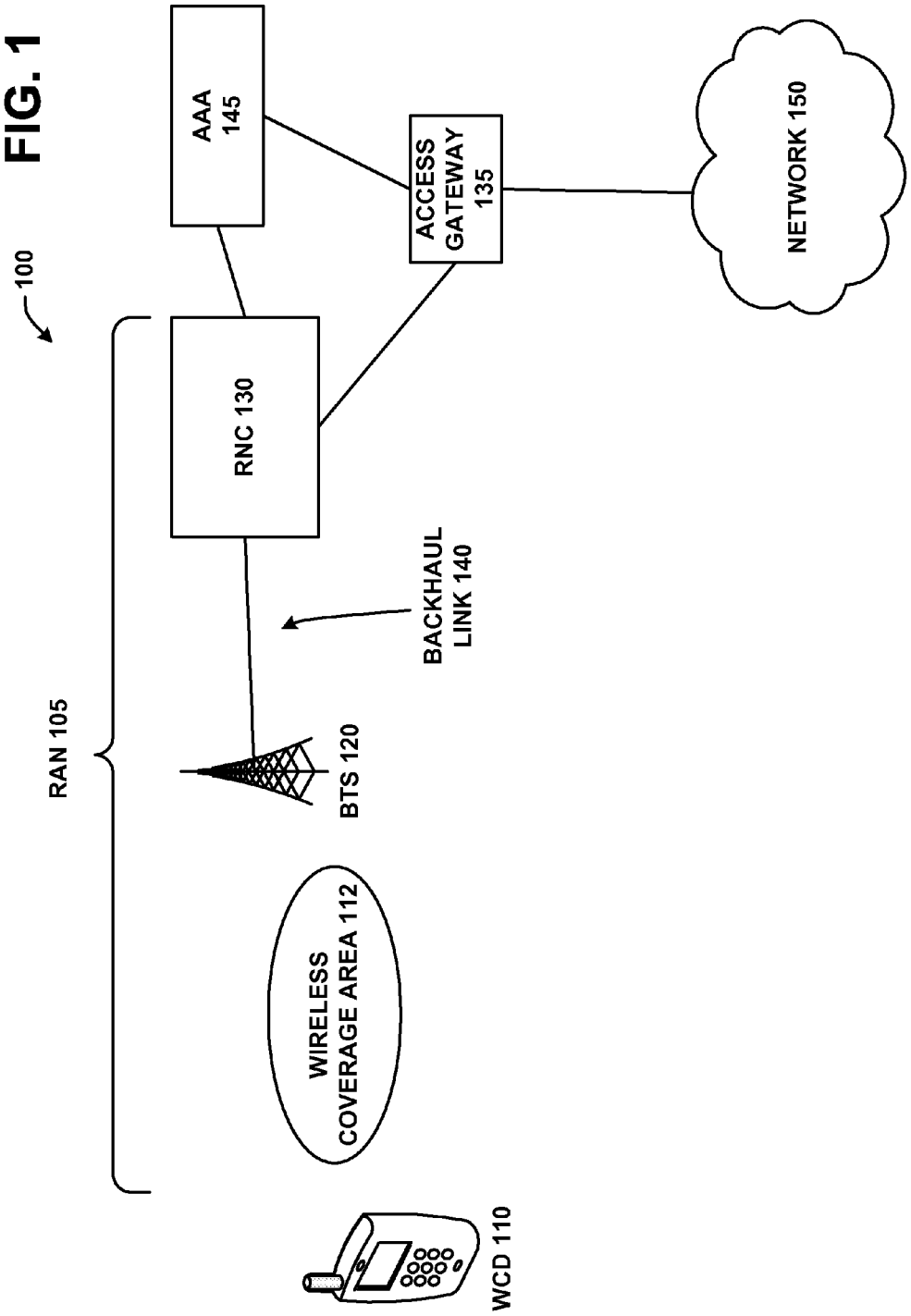
FIG. 1 depicts a communication system in accordance with a preferred embodiment.

FIG. 1 depicts an exemplary communication system 100. In communication system 100, RAN 105 includes a wireless coverage area 112, base transceiver station (BTS) 120, and RNC 130. BTS 120 may be communicatively coupled to RNC 130 via backhaul link 140. Preferably BTS 120 radiates to define wireless coverage area 112. For purposes of illustration, only one wireless coverage area, one BTS and one RNC is shown. However, more of each of these components may be present in a RAN. For example, a RAN may include several BTSs radiating to define more wireless coverage areas, several RNCs operating in conjunction with one or more BTSs, and so on.

Along with performing other tasks, RNC 130 may manage the wireless resources associated with BTS 120, and route traffic to and from BTS 120. Alternatively, a base station controller (BSC), or some other type of device, may be used in place of RNC 130. Regardless of the exact configuration, RNC 130 may be communicatively coupled to network 150 via access gateway 135.

Backhaul link 140 may comprise any type of wireline or wireless communication path between an RNC and a BTS. Example types of backhaul technologies include Ethernet, 802.11 (Wifi), Asynchronous Transfer Mode (ATM), Synchronous Optical Networking (SONET), satellite systems, and/or any of the various T-carriers. There may be multiple backhaul links between any RNC/BTS pair, and these links may span a range of physical distances from a few inches or less to hundreds of miles. For example, a wireless network may deploy BTSs in remote locations while centralizing their RNCs. In this kind of arrangement the BTSs may be deployed in rural locations and small towns, while the RNCs are located in cities. Due to the expense of maintaining high-capacity backhaul links between BTSs and RNCs that are physically distant, these backhaul links may have only limited capacity.

Wireless coverage area 112 may provide air interface access to WCDs, such as WCD 110. In a preferred embodiment, BTS 120 generates signals on one or more forward link channels. These channels may be formed via a set of orthogonal Code Division Multiple Access (CDMA) Walsh codes, each of which may be used to modulate the data that BTS 120 transmits on a particular channel. The channels may include a pilot channel, over which a phase offset pattern is repeatedly transmitted, a sync channel over which synchronization data is transmitted, including a time reference available to BTS 120, and traffic channels over which the data directed to WCDs is transmitted. Additionally, one or more of the Walsh codes may be designated as primary and/or secondary paging channels.

The air interface of the wireless coverage areas may also include reverse link channels, which may also be formed through the use of CDMA, for transmitting data from a WCD to RAN 105. These reverse link channels may include, for example, an access channel for responding to paging messages, and reverse traffic channels. Thus, through the forward and reverse link channels, RAN 105 and WCDs may exchange signaling and bearer data. Of course CDMA is not the only technology that can provide wireless forward and reverse link channels, and other technologies may be used instead. These other technologies include, but are not limited to, Worldwide Interoperability for Microwave Access (WIMAX®), Universal Mobile Telecommunications System (UMTS®), Long Term Evolution (LTE®), IDEN®, or 802.11 (Wifi).

A WCD in communication system 100, such as WCD 110, could be a wireless telephone, a wireless personal digital assistant, a wirelessly equipped laptop computer, a wireless router, or another type of mobile or fixed wireless device. Preferably, a WCD is a subscriber device that is manipulated by a human in order to establish circuit-switched or packet-switched voice and/or data calls. However, a WCD could also be an automated device without a human interface. A WCD may be associated with one or more BTSs at a time and may use the wireless coverage areas of these BTSs to communicate with correspondent nodes, such as web servers, gaming servers, short message service (SMS) servers, signaling and media nodes used to support real-time protocols, and other WCDs.

Access gateway 135 may be a router-like device that manages the connectivity of WCDs to a packet-switched network, such as the Internet. Examples of access gateways include packet data serving nodes (PDSNs) and WIMAX® access serving network gateways (ASN-GWs). In an example embodiment, access gateway 135 may serve tens, hundreds or thousands of WCDs via point to point protocol (PPP) links to each of these WCDs. However, a PPP link to a WCD is not required for access gateway 135 to serve a WCD.

AAA 145 is preferably an authentication, authorization, and accounting server. Accordingly, AAA 145 may support one or more of the well known network protocols RADIUS (see for example, Internet RFC 2865, "Remote Authentication Dial In Subscriber Service (RADIUS)," incorporated in its entirety herein by reference) and/or DIAMETER (see for example, Internet RFC 3588, "Diameter Base Protocol," incorporated in its entirety herein by reference). An AAA server, such as AAA 145, is typically a device that maintains a profile for each WCD registered with an operator of exemplary communication network 100. However, AAA server 145 may maintain profiles for other WCDs as well. Such a profile may contain an indication of the identity of each WCD and the WCD's subscriber (e.g., the WCD's user). For example, a profile for a given WCD may include the given WCD's Network Access Identifier (NAI), Mobile Directory Number (MDN), International Mobile Subscriber Identifier (IMSI), electronic serial number (ESN), and/or a mobile equipment identifier (MEID). Such a profile may also include username, password, and/or any other information, general or specific, to the given WCD. AAA 145 may be arranged so that profiles can be efficiently searched for, or looked up, by one or more parameters. These parameters may include any of a WCD's identifiers (e.g., a NAI, MDN, IMSI, ESN, or MEID) and/or an IP address assigned to the WCD.

In FIG. 1, AAA 145 is able to communicate with RNC 130 and access gateway 135. Preferably, when a WCD, such as WCD 110, attempts to access RAN 105, RNC 130 and/or access gateway 135 may communicate with AAA 145 to authenticate the WCD and authorize the WCD for service. Additionally, a WCD profile stored in AAA 145 may include further information, such as particular services available to the WCD.

It should be appreciated that the elements in FIG. 1 are exemplary, and embodiments of this invention may include more or fewer elements than in communication system 100, and the elements of communication system 100 may be arranged differently or omitted altogether. For example, there may be multiple access gateways that communicate with RAN 105, and RAN 105 may contain one or more RNCs and BSCs. Furthermore, each element of communication system 100 may comprise multiple physical or logical devices or components, or may be combined into fewer physical or logical components than are shown in FIG. 1.

II. Access Device Embodiment

Figure 2:
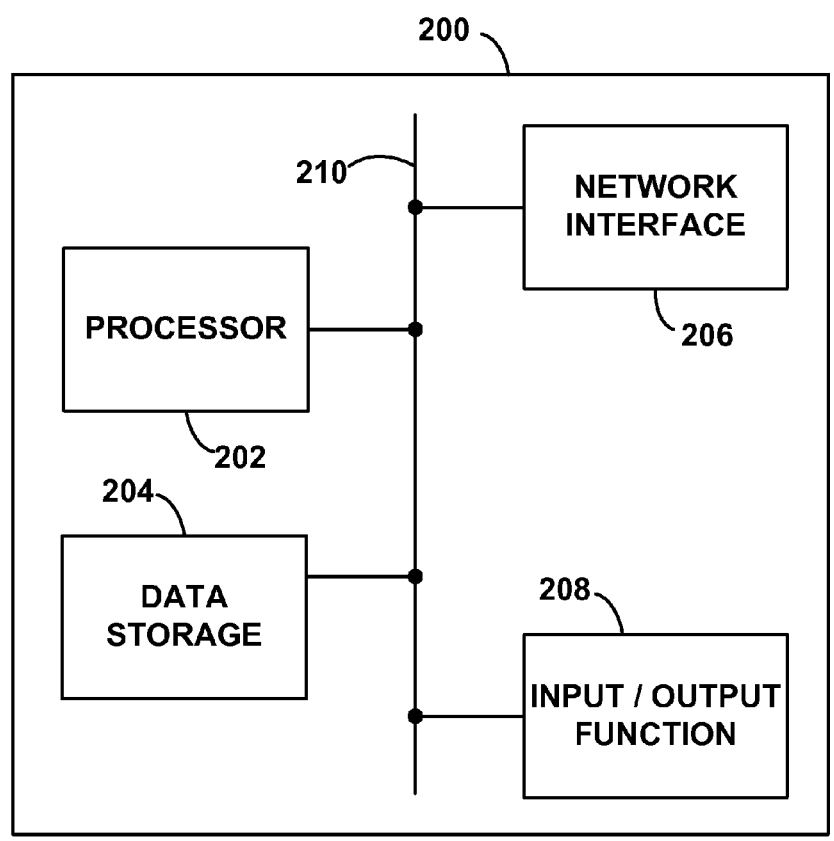
FIG. 2 is a block diagram of an access device in accordance with a preferred embodiment.

FIG. 2 is a simplified block diagram exemplifying an access device 200, and illustrating some of the functional components that would likely be found in an access device arranged to operate in accordance with the embodiments herein. Example access device 200 could be any type of access device, such as a BTS, BSC, RNC, or access gateway. For purposes of simplicity, this specification may equate access device 200 to an RNC from time to time. Nonetheless, it should be understood that the description of access device 200 could apply to any component found in a RAN, or used for the purposes described herein.

Example access device 200 preferably includes a processor 202, a data storage 204, a network interface 206, and an input/output function 208, all of which may be coupled by a system bus 210 or a similar mechanism. Processor 202 preferably includes one or more CPUs, such as one or more general purpose processors and/or one or more dedicated processors (e.g., application specific integrated circuits (ASICs) or digital signal processors (DSPs), etc.) Data storage 204, in turn, may comprise volatile and/or non-volatile data storage and can be integrated in whole or in part with processor 202.

Data storage 204 preferably holds program instructions executable by processor 202, and data that is manipulated by these instructions, to carry out the various methods, processes, or functions described herein. (Alternatively, these methods, processes, or functions can be defined by hardware, firmware, and/or any combination of hardware, firmware and software.) By way of example, the data in data storage 204 may contain program instructions executable by processor 202 to carry out any of the methods, processes, or functions disclosed in this specification or the accompanying drawings.

Network interface 206 may take the form of a wireline connection, such as an Ethernet, Token Ring, or T-carrier connection. Network interface 206 may also take the form of a wireless connection, such as IEEE 802.11 (Wifi), BLUETOOTH®, or a wide-area wireless connection. However, other forms of physical layer connections and other types of standard or proprietary communication protocols may be used over network interface 206. Furthermore, network interface 206 may comprise multiple physical interfaces.

Input/output function 208 facilitates user interaction with example access device 200. Input/output function 208 may comprise multiple types of input devices, such as a keyboard, a mouse, a touch screen, and so on. Similarly, input/output function 208 may comprise multiple types of output devices, such as a monitor, printer, or one or more light emitting diodes (LEDs). Additionally or alternatively, example access device 200 may support remote access from another device, via network interface 206 or via another interface (not shown), such an RS-232 port.

III. QOS Overview and Use

As discussed herein, QOS may refer to a number of different mechanisms in which a flow of one or more packets can be given some type of priority over at least some packets in another flow. For purposes of simplicity, the discussion below will focus an exemplary method of providing QOS. However, the embodiments here should not be limited to just this method as other methods could be used to achieve the same or similar QOS outcomes.

Preferably, a packet, such as an IP packet, contains a QOS indication field. Such a field may adhere to a differentiated services standard, such as that defined by IETF RFC 2474 and incorporated by reference in its entirety herein. Thus, the QOS indication field may comprise a differentiated services code point (DSCP) appearing in the packet's header. (In an IP header, the DSCP may be placed in the IP type of service (TOS) field.)

The DSCP preferably contains a value designating a desired treatment of the packet. Typically a DSCP consists of one or more bits in a pattern that can be interpreted to specify a forwarding preference and/or a drop preference. For instance, assuming for the moment that the DSCP comprises six bits, the pattern 001010 may indicate the highest level of forwarding preference (resulting in a lower latency service), while the pattern 000000 may indicate a best-effort service (resulting in a higher latency service). Similarly, additional patterns may include indications of a level of drop precedence. (Herein, "dropping" a packet includes various ways to delete, discard, or overwrite the contents of the packet, thereby preventing the packet from reaching its ultimate destination.)

Accordingly, when a router, switch, firewall, BTS, BSC, RNC, access gateway, or another network component receives a packet, this device may examine the packet's DSCP, and apply an appropriate forwarding and/or drop policy to the packet. For example, the device may implement different egress queues, in software or in hardware, for each DSCP value. Thus, the device may place packets with a DSCP of 001010 in a high priority queue, and place packets with a DSCP of 000000 in a low priority queue. Then, the device may forward packets in higher priority queues before serving at least some packets in lower priority queues. Thus, packets with a DSCP indicative of a higher forwarding preference are likely to experience a lower end to end latency and jitter as these packets traverse routers, switches, firewalls, and other network components.

Therefore, by marking packets that are part of a real-time flow with an appropriate DSCP, these packets may receive a low-latency, low jitter service that is desirable for real-time services. It should be understood that for the purposes of this description, the term "latency" may be used to describe the delay that a packet undergoes while the packet travels from one point to another in a network. Furthermore, the term "jitter" may be used to describe a form of delay variability that the packet undergoes while travelling between these two points. There are multiple ways in which latency and jitter can be calculated, and this description is not meant to exclude any reasonable method for doing so.

Furthermore, by marking packets that are part of a best-effort flow with a DSCP that is indicative of best-effort service, these packets may be forwarded with a relatively lower priority. Accordingly, when a device has both real-time and best-effort packets queued for forwarding, the device may forward at least some of the real-time packets before forwarding the best-effort packets.

Typically, packets containing media from a real-time service, such as VoIP, PTT, and VOD may be marked with a real-time QOS, whereas packets containing data from a best-effort service, such as email, web browsing, or file transfer, may be marked with a best-effort QOS. In some types of access network, such as a RAN, real-time applications may explicitly seek to reserve capacity in the access network for real-time packet flows. Thus, for instance, a WCD, such as WCD 110, may signal to one or more of BTS 120, RNC 130, and access gateway 135 that it seeks to engage in a VoIP session. Accordingly, BTS 120, RNC 130, and/or access gateway 135 may reserve sufficient capacity to support the VoIP session. Then, during the VoIP session, WCD 110 may mark all packets that are part of a real-time flow that it transmits with a real-time DSCP. The BTS 120, RNC 130, and/or access gateway 135 may grant all packets originating from WCD 110 and marked in this fashion a real-time QOS. Further, other endpoints with which WCD 110 engages in the VoIP session may also mark all packets that are part of the real-time flow with a real-time DSCP. Accordingly, the BTS 120, RNC 130, and/or access gateway 135 may grant real-time QOS to packets originating from or in transit to WCD 110 and marked in this fashion.

Furthermore, in order to prevent WCD 110 from using more capacity than it requires for the VoIP session, the BTS 120, RNC 130, and/or access gateway 135 may not honor real-time QOS markings of any packet that is either not packet of the VoIP packet flow, or that exceeds the reasonable capacity of the VoIP flow. Thus, QOS enforcement may involve a policing function as well as a prioritization function. When invoking such a policing function, BTS 120, RNC 130, and/or access gateway 135 may either ignore the real-time QOS marking of the packet, or re-mark the packet with a different QOS marking, such as a best-effort DSCP.

Typically, VoIP, PTT, VOD, and other types of real-time applications are deeply integrated into a WCD. For instance, a WCD may contain a "native" VoIP application with the authority to signal to RAN devices that it seeks to engage in a VoIP session. Thus, this native application may mark packets with a real-time DSCP and then transmit these packets. However, a new class of applications and services have recently emerged that may lack these abilities.

More and more endpoints, including newer WCDs, are based on general-purpose computing platforms running general-purpose operating systems. Some manufacturers have launched "app stores" from which WCD users can download third-party applications that can be run on their specific WCDs. For example, app stores exist for the APPLE® IPHONE®, the GOOGLE® ANDROID®, and the PALM WEBOS® operating systems. Some of these downloadable "apps" may include third-party VoIP applications, such as SKYPE® and GOOGLE TALK®. Since third-party applications may not be native or deeply integrated into a WCD's operating system, these third-party applications may not have the authority or the ability to signal to RAN devices that the WCD seeks to engage in a VoIP session, and to mark and transmit packets with a real-time DSCP. Thus, third-party real-time applications may be relegated to using best-effort QOS, and as a result, may suffer from poor performance when compared to native real-time applications.

From a wireless service provider's point of view, it may desirable to allow subscribers to use these third-party real-time applications. Some user may already utilize applications such as SKYPE® and GOOGLE TALK® on their laptop computers or desktop computers. Allowing these users to employ the same application on their WCDs makes the wireless service provider's offerings more attractive than those of a competing wireless service provider that attempts to prevent the use of these applications. To that end, a wireless service provider may even attempt to provide an enhanced level of best-effort QOS to the real-time media that is transmitted and received by certain third-party real-time applications. In doing so, the experience of the wireless service provider's subscribers who use these applications may be enhanced.

For instance, the wireless service provider may attempt to detect real-time flows that are associated with SKYPE® or GOOGLE TALK®, and mark these packets with an enhanced best-effort DSCP. Then, when a router, switch, firewall, BTS, BSC, RNC, access gateway, or another network component encounters a packet so marked with enhanced best-effort QOS, this device may grant the packet a higher forwarding priority than packets marked with best-effort QOS. Additionally, the device may grant the packet marked with enhanced best-effort QOS a lower forwarding priority than packets marked with real-time QOS. In this way, traffic from conventional real-time applications still has precedence over traffic from third-party real-time applications, while traffic from third-party real-time applications has precedence over traffic from best-effort applications.

Thus, if a device that routes and/or forwards these types of packets experiences congestion, the device may first try to ensure that some or all traffic from conventional real-time applications are forwarded within a reasonable time frame. Then, in whatever capacity remains, the device may attempt to forward traffic from third-party real-time applications. Once some or all of the traffic from third-party real-time applications is served, the device may forward any traffic from best-effort applications. The net effects of this regime may include (i) conventional real-time applications being the least impacted by network congestion, and (ii) third-party real-time applications being granted a better service than best-effort applications when the device is congested. Furthermore, in preferable embodiments, conventional real-time applications are not negatively impacted by the presence of third-party real-time applications receiving an enhanced best-effort QOS.

The benefits of the arrangement described above can be further understood in the following illustrative example. Suppose that three WCD subscribers, subscriber A, subscriber B, and subscriber C, are served by the same wireless coverage area. Suppose further that any traffic that these subscribers transmit or receive must flow through at least one common device, such as a BTS, RNC, access gateway, etc. In this illustrative example, subscriber A is using a conventional real-time application, subscriber B is using a third-party real-time application such as SKYPE®, and subscriber C is using a best-effort application, such as a File Transfer Protocol (FTP). When the common device is not congested, the common device may forward packets from all three of these applications in a reasonable time frame. Thus, the QOS markings on the packets have little, if any, effect on the user experiences of subscribers A, B, and C. However, if the common device is congested, then the conventional real-time application may receive the best service, while the best-effort application may receive the worst service. The third-party real-time application may receive a level of service in between that of the other two applications.

Suppose that subscriber A terminates use of the conventional real-time application. Then, if the common device is not congested, the common device may forward packets from the remaining third-party real-time application and the best-effort application in a reasonable time frame. However, if the common device is congested, then the third-party real-time application may receive the best overall level of service, while the best-effort application may be relegated to using only the capacity not used by the third-party real-time application.

Given that real-time applications, including third-party real-time applications, are typically more adversely impacted by latency than best-effort applications, the features described herein may provide a better user experience than if third-party real-time applications were given only best-effort QOS. Accordingly, the wireless service provider may selectively apply enhanced best-effort QOS to only the third-party real-time applications of subscriber who have registered for a premium service. For instance, the wireless service provider may market their premium service as "SKYPE® friendly" or "GOOGLE TALK® friendly." Then, perhaps for a fee, a subscriber can include the premium service in his or her account. In this way, the subscriber is granted an enhanced best-effort QOS, while the wireless service provider can be reasonably compensated for offering the premium service.

Further detail regarding the usage of enhanced best-effort QOS can be found in the following message flows and flow charts.

IV. Example Message Flow and Flow Charts

Figure 3:
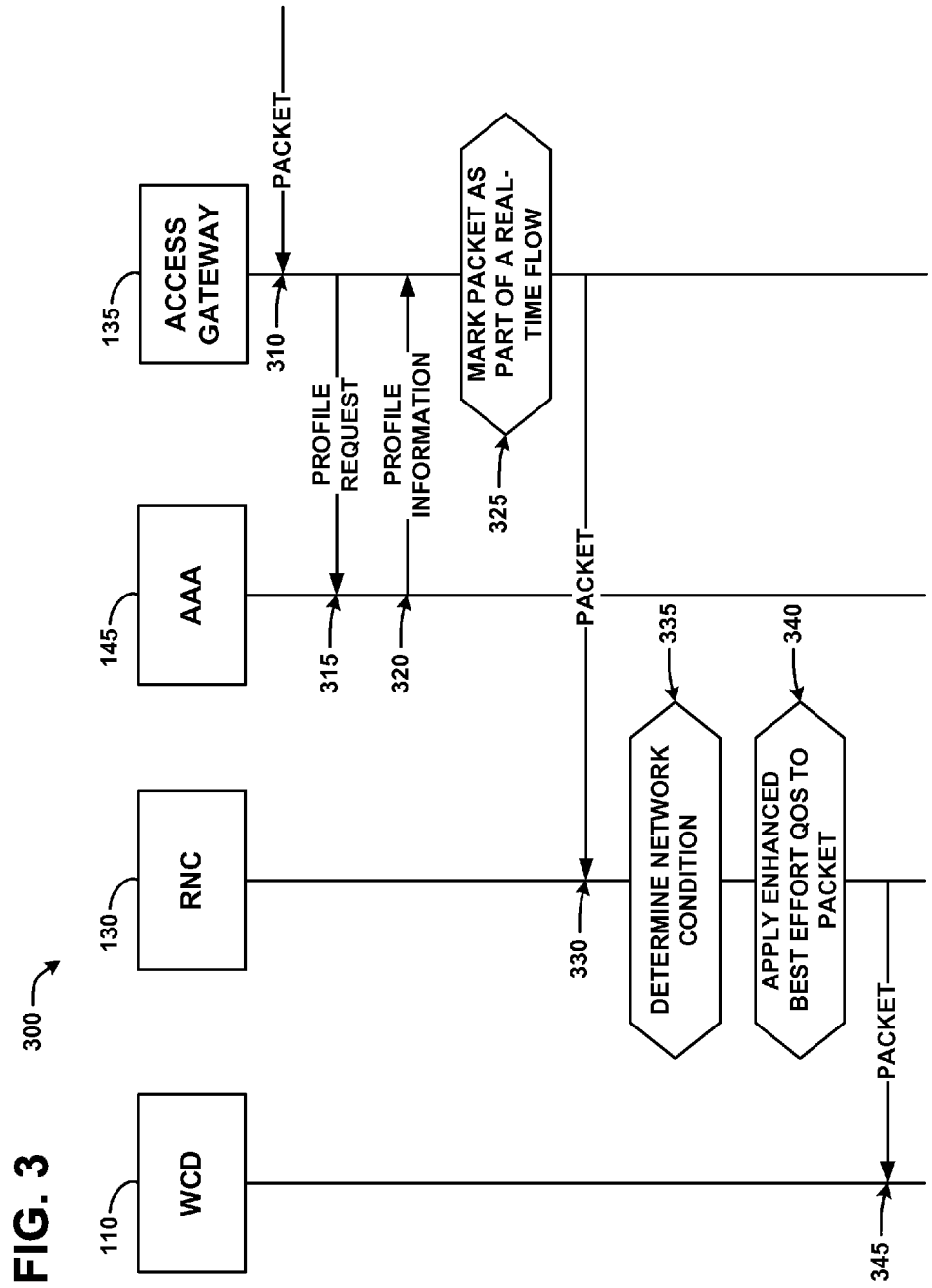
FIG. 3 is a message flow diagram in accordance with a preferred embodiment.

Message flow 300 in FIG. 3 exemplifies ways in which a third-party real-time application can be granted an enhanced best-effort QOS. Message flow 300 includes several devices that may take part in the embodiments, including WCD 110, RNC 130, AAA 145, and access gateway 135. Thus, for example, these devices may be arranged with or in conjunction with a RAN, such as RAN 105. However, other devices may also take part in message flow 300, but reference to any such devices has been omitted for sake of simplicity. Furthermore, message flow 300 may entail more or fewer steps than shown in FIG. 3, and these steps may occur in a different order, without departing from the scope and spirit of the invention.

At step 310, a packet may be received at access gateway 135. This packet may arrive from the Internet or a private IP network. Preferably, the packet contains a source IP address field and a destination IP address field.

In response to receiving the packet, access gateway 135 may check the packet's source address to determine whether the source address is associated with a third-party real-time service, such as SKYPE® and GOOGLE TALK®. For instance, access gateway 135 may be provisioned with one or more lists of IP addresses that are known or presumed to be third-party real-time service gateways or servers. In particular, the wireless service provider may receive these lists from the operators of the third-party real-time services. However, access gateway 135 may use other information in the packet, such as a port number or payload content, to determine whether the packet is associated with a third-party real-time service.

If access gateway 135 determines that the packet is associated with a third-party real-time service, access gateway 135 may then perform further checks to determine if the packet should be marked with an enhanced best-effort QOS. For instance, access gateway 135 may look up a profile associated with the packet's destination WCD. To achieve this end, at step 315, access gateway 135 may transmit a profile request message to AAA 145. Preferably, the profile request message contains the destination IP address of the packet, or another type of WCD identifier. Alternatively, access gateway 135 may map the destination IP address designated in the packet to a WCD identifier (e.g., an NAI, IMSI, ESN, MEID, or similar type identifier) and include the WCD identifier in the profile request.

In response to receiving the profile request, AAA 145 may look up the requested profile. For sake of illustration, assume that the destination IP address in the packet is an IP address that has been assigned to, or is in use by, WCD 110. Then, the profile may be that of WCD 110, and may include information related to WCD 110. This information may comprise services and features to which WCD 110 has subscribed. For instance, if WCD 110 is subscriber to a prepaid service or a roaming service, this profile may indicate such. One of these services and features may be an enhanced best-effort QOS feature that allows WCD 110 to make use of the enhanced best-effort QOS for third-party real-time applications.

At step 320, AAA 145 may transmit information from at least part of the profile of WCD 110 to access gateway 135. From the profile information, access gateway 135 may determine that WCD 110 has subscribed to an enhanced best-effort QOS for third-party real-time services. Accordingly, at step 325, access gateway 135 may mark the packet as being part of a flow of a third-party real-time service.

This marking may take many varying forms. For example, the marking could comprise marking the packet with an enhanced best-effort DSCP in the packet's QOS field. On the other hand, different fields in the packet could be marked in different ways to achieve the same end. Furthermore, in some types of RAN, packets may be tunneled from an access gateway to an RNC. Generally speaking, tunneling involves amending a packet (such as an IP packet) with an additional header (such as an IP header). Thus, in a tunneled packet, each one of the headers may contain a QOS field that can be marked with an enhanced best-effort DSCP. Alternatively, some forms of tunneling, such as Generic Routing Encapsulation (GRE) or the Layer-Two Tunnel Protocol (L2TP) may involve placing additional information between the two headers. Therefore, step 325 may comprise marking a portion of this additional information.

Regardless of how the marking at access gateway 135 takes place, access gateway 135 may attempt to avoid conducting a transaction with AAA 145 each time access gateway 135 receives a packet with a source IP address associated with a third-party real-time service. Therefore, access gateway 135 may store a representation of flow parameters associated with the packet, and an indication that packets from this same flow should be marked as being associated with a third-party application. Preferably, the representation is stored in a searchable table. The flow parameters may include, for example, the packet's source IP address and destination IP address. Alternatively or additionally, the flow parameters may include the packet's source and/or destination port numbers. These port numbers may be that of the Transmission Control Protocol (TCP), User Data Protocol (UDP), or other transport protocols. Once flow parameters are saved at access gateway 135, upon receiving a second packet, access gateway 135 may look up the second packet's flow parameters to determine whether to mark the second packet as associated with a third-party real-time service.

Accordingly, access gateway 135 may perform steps 310, 315, 320, and 325 as follows. Upon receiving the packet at step 310, access gateway 135 may determine the packet's flow parameters and look up at least some of these parameters in the searchable table of stored flow parameters. If access gateway 135 finds the packet's flow parameters in this table, access gateway 135 may skip steps 315 and 320, and mark the packet as being from a third-party real-time application. However, if access gateway 135 does not find the packet's flow parameters in the table, access gateway 135 may perform steps 315 and 320 to acquire information from a profile. If the information indicates that the destination WCD (WCD 110) has subscribed to a premium service granting the WCD enhanced real-time QOS for third-party real-time applications, access gateway 135 may then store the packet's flow parameters in the table, and mark the packet as being from a third-party real-time application.

Continuing with message flow 300, at step 330, access gateway 135 may forward the packet to RNC 130. Upon receiving the packet, RNC 130 may determine that the packet is marked as being from a third-party real-time application. In response to this determination, RNC 130 may further determine if one or more network conditions are met. These network conditions may vary in type and form and are described in detail below in reference to FIG. 5. On the whole, however, RNC 130 may make this second determination to find out if it is likely that the packet will suffer from some form of congestion between RNC 130 and WCD 110. If it is likely that the packet will suffer from congestion, RNC 130 may mark the packet with an enhanced best-effort QOS. In doing so, RNC 130 may be seeking to mitigate the impact of the congestion, by giving packet a higher priority than packets from best-effort application. However, if it isn't likely that the packet will suffer from congestion, RNC 130 may mark the packet with a best-effort QOS. In this way, the RAN will not use resources to give the packet special treatment unless doing so is likely to have a material impact on the ability of the RAN to deliver the packet to WCD 110 in a reasonable time frame. Of course, RNC 130 may be arranged to grant enhanced best-effort QOS to any packet marked as being associated with a third-party real-time application.

Thus, assuming that RNC 130 determines that the packet is likely to be subject to congestion, at step 340, RNC 130 may mark the packet with an enhanced best-effort QOS. Then, at step 345, RNC 130 may transmit the packet to WCD 110. Between RNC 130 and WCD 110, the packet may traverse one or more routers, switches, and firewalls, as well as a BTS. Preferably, these devices honor the enhanced best-effort QOS marking of the packet, and forward the packet accordingly.

Figure 4:
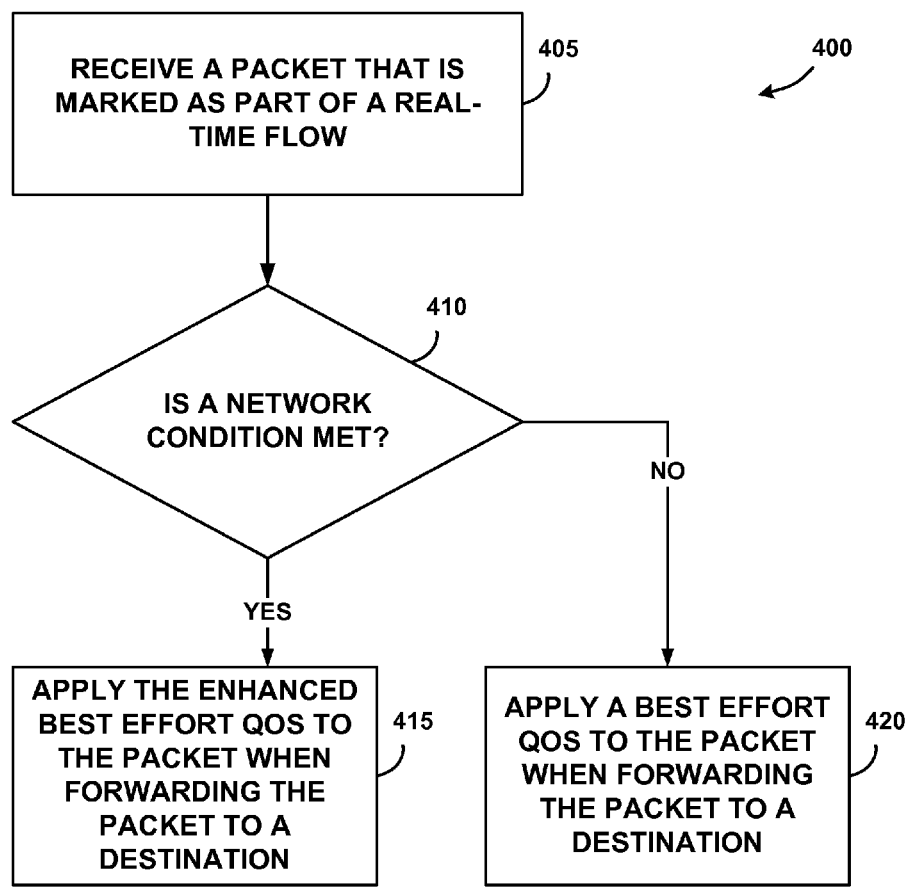
FIG. 4 is a flow chart in accordance with a preferred embodiment.

FIG. 4 is a flow chart 400 of an exemplary method that may take place at an access device, such as an RNC, that supports a non-real-time best-effort QOS and a non-real-time enhanced best-effort QOS. It should be understood that the "access device" term used herein is a generic designation for any type of network element that is capable of performing the functions described herein. Thus, an "access device" is not limited to being an RNC. Furthermore, method 400 is similar, at least in some ways, to the procedures described in reference to steps 330, 335, 340, and 345 of message flow 300, but is described in a greater level of detail so as to further illustrate possible embodiments of the invention.

At step 405, the access device may receive a packet marked as being part of a real-time flow. Preferably, this packet is associated with a third-party application. At step 410, the access device may determine whether a network condition is met. If the network condition is met, then, at step 415, the access device may apply the enhanced best-effort QOS to the packet, and forward the packet to a destination device. If the network condition is not met, then, at step 420, the access device may apply the best-effort QOS to the packet, and then forward the packet to the destination device.

Applying a particular level of QOS may comprise the sub-steps of marking the packet with a DSCP indicating the particular level of QOS, and taking this particular level of QOS into account when forwarding the packet. For example, the access device may grant packets marked with the enhanced best-effort QOS priority over at least some packets marked with the best-effort QOS.

Turning to FIG. 5, flow chart 500 is an exemplary method for determining when the network condition is met. Although flow chart 500 includes several different types of network conditions, each and every one of these network conditions need not be met in order to determine that the access device should apply the enhanced best-effort QOS.

At step 505, a determination is made as to whether a level of congestion on a backhaul link is too high. Preferably, the access device communicates with the destination device via the backhaul link. For instance, if the access device is an RNC, the backhaul link might be between the RNC and a BTS. Thus, packets transmitted from the RNC to a WCD would traverse the backhaul link. The level of congestion on the backhaul link may be considered to be too high if the level of congestion exceeds a predetermined threshold.

In order to measure the level of congestion on a backhaul link, one or more devices coupled to the backhaul link, such as but not limited to an RNC and a BTS, may support the Internet Engineering Task Force (IETF) Simple Network Management Protocol (SNMP). SNMP is defined in IETF Requests For Comments (RFCs) 1901, 2576, 2578-2580, and 3410-3418, which are incorporated by reference in their entirety herein. Accordingly, the RNC and/or the BTS may support one or more Management Information Base (MIB) objects that provide access to data representing a load on the backhaul link. It should be understood that SNMP need not be supported to determine the level of congestion on the backhaul links. Other protocols, standard or proprietary, may be used to accomplish the same purpose.

The load on the backhaul link may be in the form of bits per second of traffic, packets per second of traffic, a percentage of utilized capacity, or some other metric. Furthermore, the load may be represented as a smoothed average of measurements, such as an average percentage of utilized capacity calculated over a number of measurements taken over a period of time.

Regardless of its exact representation, this information is preferably available via SNMP. For instance, the RNC may determine a representation of the load on the backhaul link from one or more of its MIB objects. Alternatively, the RNC may use SNMP to query other devices for this information. Apart from how the RNC determines this load, the RNC may calculate a level of congestion based on the load. For instance, the RNC may base the calculation of the level of congestion on how close the determined load is to the maximum capacity of the backhaul link.

If the level of congestion is determined to be too high, at step 515 the access device may determine that the network condition has been met. Otherwise, at step 510, the access device may determine whether the destination device is operating a non-real-time application that uses a high data rate. For instance, if a WCD is using a third-party real-time application, such as SKYPE®, but also operating a non-real-time application, such as FTP or a web browsing, traffic from the non-real-time application may interfere with traffic from the third-party real-time application. Thus, if the data rate of the non-real-time application exceeds a predetermined threshold, at step 515 the access device may determine that the network condition has been met.

Otherwise, at step 520, the access device may determine whether the actual total data rate from the access device to the destination device is too close to a maximum achievable data rate from the access device to the destination device. For instance, a WCD may be assigned a maximum forward link data rate. This maximum assigned data rate may vary with time, as air interface conditions between the BTS and WCD fluctuate. Thus, the BTS and/or the RNC may determine the maximum data rate based on the extent of distortion, interference, or attenuation being experienced by the WCD when the WCD receives forward link signals.

The total data rate to the WCD may include a portion attributable to the third-party real-time application, and a portion attributable to other applications. These other applications may include real-time and non-real-time applications. If this total data rate is within a threshold value of the maximum assigned data rate, the traffic from the other applications may interfere with the third-party real-time application. In this case, at step 515, the access device may determine that the network condition has been met. Otherwise, at step 525, the access device may determine that the network condition has not been met.

After the access device tests for one or more conditions in this manner, the access device may then apply either the enhanced best-effort QOS or the best-effort QOS based on the outcome of the test(s). It should be understood that the tests that the access device may use are not limited to the tests described herein, and other tests may be used in addition to, or in place of, the tests herein. Additionally, the access device need not perform any of these tests for each packet it forwards. Thus, the access device, may perform each test periodically, or from time to time, and store the results of the test. Then, when determining whether a network condition is met, the access device may reference the stored results, and determine which level of QOS to apply to the packet based on these results.

In further embodiments that may not be explicitly illustrated in FIG. 4 or 5, the access device may receive a second packet that is not marked as being part of a real-time flow. Thus, this second packet is preferably not associated with a third-party application. Accordingly, the access device may apply the best-effort QOS to the packet, and then forward the packet to the destination device without first determining whether the network condition is met.

It should be understood that the message flow and flow charts of FIGS. 3, 4, and 5 may each include more or fewer steps without departing from the scope of the invention. Further, the content of these drawings may be combined, in whole or in part, to form additional methods and/or process that are within this scope.

IV. Conclusion

Exemplary embodiments have been described above. Those skilled in the art will understand, however, that changes and modifications may be made to these embodiments without departing from the true scope and spirit of the invention, which is defined by the claims.

What is claimed is:

1. A method comprising:
an access device receiving, from a client device, a packet, wherein the packet contains a field indicating that a real-time quality of service (QOS) is requested for the packet;
the access device determining that a communication session between the client device and a destination device has not been established for the packet;
in response to the packet containing the field indicating that the real-time QOS is requested for the packet and the communication session between the client device and the destination device having not been established for the packet, the access device determining whether a network condition is met;
if the network condition is met, the access device marking the packet with an enhanced best-effort QOS, and applying the enhanced best-effort QOS to the packet when forwarding the packet to the destination device, wherein the access device forwards packets marked with the real-time QOS with higher priority than packets marked with the enhanced best-effort QOS; and
if the network condition is not met, the access device marking the packet with a best-effort QOS, and applying the best-effort QOS to the packet when forwarding the packet to the destination device, wherein the access device forwards packets marked with the enhanced best-effort QOS with higher priority than packets marked with the best-effort QOS.

2. The method of claim 1, wherein the access device communicates with the destination device via a backhaul link, and wherein the network condition comprises a level of congestion on the backhaul link.

3. The method of claim 1, wherein the packet is associated with a real-time application operating on the destination device, wherein the destination device is also operating at least one non-real-time application, and wherein the network condition comprises a data rate used by the at least one non-real-time application.

4. The method of claim 1, wherein the access device is part of a radio access network (RAN) that radiates to define a wireless coverage area, wherein the wireless coverage area provides service to wireless communication devices (WCDs), wherein the destination device is a WCD served by the RAN, and wherein the network condition is met when an actual data rate from the access device to the destination device is within a threshold value of a maximum wireless data rate from the access device to the destination device.

5. A method, performed by a radio network controller (RNC) in a radio access network (RAN), wherein the RAN radiates to define a wireless coverage area that provides service to wireless communication devices (WCDs), the method comprising:
the RNC receiving a packet, wherein the packet specifies a given WCD as a destination, and wherein the packet contains a field indicating that a real-time quality of service (QOS) is requested for the packet;
the RNC determining that a communication session between a client device and the given WCD has not been established for the packet;
in response to the packet containing the field indicating that the real-time QOS is requested for the packet and that the communication session between the client device and the given WCD having not been established for the packet, the RNC determining whether a network condition is met;
if the network condition is met, the RNC marking the packet with a first non-real-time QOS and applying the first non-real-time QOS to the packet when forwarding the packet to the given WCD, wherein the RNC forwards packets marked with the real-time QOS with higher priority than packets marked with the first non-real-time QOS; and
if the network condition is not met, the RNC marking the packet with a second non-real-time QOS and applying the second non-real-time QOS to the packet when forwarding the packet to the given WCD, wherein the RNC forwards packets marked with the first non-real-time QOS with higher priority than packets marked with the second non-real-time QOS.

6. The method of claim 5, wherein the first non-real-time QOS is an enhanced best-effort QOS and the second non-real-time QOS is a best-effort QOS.

7. The method of claim 5, wherein the RAN communicates with the WCD via a backhaul link, and wherein the network condition comprises a level of congestion on the backhaul link.

8. The method of claim 7, wherein the network condition comprises the level of congestion exceeding a threshold.

9. The method of claim 5, wherein the packet is associated with a real-time application operating on the given WCD, wherein the given WCD is also operating at least one non-real-time application, and wherein the network condition comprises a data rate of the at least one non-real-time application.

10. The method of claim 9, wherein the network condition comprises the data rate of the at least one non-real-time application exceeding a threshold.

11. The method of claim 5, wherein the network condition is based on (i) a maximum data rate from the RNC to the given WCD, and (ii) an actual data rate from the RNC to the given WCD.

12. The method of claim 11, wherein the actual data rate is within a threshold value of the maximum data rate.

13. A system comprising:
- at least one processor;
- at least one non-transitory computer-readable medium; and
- a first module containing a first set of instructions, wherein the first set of instructions are stored on the at least one non-transitory computer-readable medium, and wherein the first set of instructions are executed by the at least one processor to (i) receive a packet, from a client device, that specifies a destination device and that contains a field indicating that a real-time quality of service (QOS) is requested for the packet, (ii) determine that a communication session between the client device and the destination device has not been established for the packet; (iii) in response to the packet containing the field indicating that the real-time QOS is requested for the packet and the communication session between the client device and the destination device having not been established for the packet, determine whether a network condition is met, (iv) if the network condition is met, mark the packet with an enhanced best-effort QOS, and apply the enhanced best-effort QOS to the packet when forwarding the packet to the destination device, wherein the system forwards packets marked with the real-time QOS with higher priority than packets marked with the enhanced best-effort QOS, and (v) if the network condition is not met, mark the packet with a best-effort QOS, and apply the best-effort QOS to the packet when forwarding the packet to the destination device, wherein the system forwards packets marked with the enhanced best-effort QOS with higher priority than packets marked with the best-effort QOS.

14. The system of claim 13, further comprising:
- a second module containing a second set of instructions, wherein the second set of instructions are stored on the at least one non-transitory computer-readable medium, wherein the second set of instructions are executed by the at least one processor to (i) receive the packet from a wide-area network, (ii) in response to receiving the packet, access a profile associated with the destination device, (iii) based on at least the profile, mark the packet so that the packet contains the field indicating that the real-time QOS is requested for the packet, and (iv) forward the packet to the first module.

15. The system of claim 14, further comprising:
- a backhaul link through which the first module forwards packets to the destination device, wherein the network condition comprises a level of congestion on the backhaul link.

16. The system of claim 14, wherein the first module is contained within a first physical device and the second module is contained within a second physical device, and wherein the first physical device and the second physical device communicate with one another via a network link.

17. The system of claim 14, wherein the network condition is based on (i) a maximum data rate from the second module to the destination device, and (ii) an actual data rate from the second module to the destination device.

18. The system of claim 13, wherein the packet is associated with a real-time application operating on the destination device, wherein the destination device is also operating at least one non-real-time application, and wherein the network condition comprises a data rate of the at least one non-real-time application.

* * * * *